(12) United States Patent
Cords et al.

(10) Patent No.: US 9,140,372 B2
(45) Date of Patent: Sep. 22, 2015

(54) PRESSURE VALVE

(71) Applicant: Robert Bosch GmbH, Stuttgart (DE)

(72) Inventors: Karl Cords, Lohr am Main (DE);
Wolfgang Spahn, Gemuenden (DE);
Dragoljub Denadija, Marktheidenfeld (DE)

(73) Assignee: Robert Bosch GmbH, Stuttgart, DE (US)

( * ) Notice: Subject to any disclaimer, the term of this patent is extended or adjusted under 35 U.S.C. 154(b) by 196 days.

(21) Appl. No.: 13/737,277

(22) Filed: Jan. 9, 2013

(65) Prior Publication Data

US 2013/0174922 A1  Jul. 11, 2013

(30) Foreign Application Priority Data

Jan. 11, 2012  (DE) .......................... 10 2012 000 368

(51) Int. Cl.
*F16K 15/00* (2006.01)
*F16K 17/06* (2006.01)
*F16K 15/02* (2006.01)
*F16K 17/04* (2006.01)

(52) U.S. Cl.
CPC ............ *F16K 17/06* (2013.01); *F16K 15/026* (2013.01); *F16K 17/04* (2013.01); *Y10T 137/7878* (2015.04); *Y10T 137/7929* (2015.04)

(58) Field of Classification Search
CPC ...... F16K 15/025; F16K 15/063; F16K 17/06
USPC .................. 137/537, 540, 524, 538; 251/176
See application file for complete search history.

(56) References Cited

U.S. PATENT DOCUMENTS

| | | | | |
|---|---|---|---|---|
| 572,580 | A | * | 12/1896 | Spitzenberg ................. 251/278 |
| 1,519,856 | A | * | 12/1924 | Lorraine ...................... 137/529 |
| 1,735,117 | A | * | 11/1929 | Kiger et al. .................. 137/538 |
| 1,961,758 | A |   | 6/1934 | Glab |
| 2,110,481 | A | * | 3/1938 | Crocker ....................... 137/469 |
| 2,112,665 | A | * | 3/1938 | Dube ......................... 236/92 C |
| 2,375,810 | A | * | 5/1945 | Nelson ......................... 137/466 |
| 2,504,470 | A | * | 4/1950 | Trautman ..................... 137/469 |
| 2,686,534 | A | * | 8/1954 | Montelius .................... 137/514 |
| 2,859,031 | A | * | 11/1958 | Hansen et al. ................ 267/175 |
| 2,908,288 | A | * | 10/1959 | Carr et al. ..................... 137/540 |

(Continued)

FOREIGN PATENT DOCUMENTS

| | | |
|---|---|---|
| DE | 3912779 A1 * | 10/1990 |
| EP | 1 103 878 A1 | 5/2001 |

(Continued)

OTHER PUBLICATIONS

Bosch Rexroth AG—Hydraulics, Safety valves direct operated, Operating instructions, RE 25010-B/10.06, Lohr am Main, Germany, published at least as early as Jan. 10, 2012 (36 pages).

*Primary Examiner* — Kevin Murphy
*Assistant Examiner* — R. K. Arundale
(74) *Attorney, Agent, or Firm* — Maginot, Moore & Beck LLP

(57) ABSTRACT

A pressure valve includes a spring plate configured to be displaced by a setting spindle. The setting spindle includes an adjustment screw configured to axially displace a spindle shaft on which the spring plate is provided. The adjustment screw and the spindle shaft are configured in such a way that virtually no torque is transmitted to the spindle shaft via the adjustment screw.

16 Claims, 5 Drawing Sheets

(56) References Cited

U.S. PATENT DOCUMENTS

| | | | | |
|---|---|---|---|---|
| 3,770,008 A | * | 11/1973 | Turney | 137/516.25 |
| 4,588,163 A | * | 5/1986 | Christensen | 251/285 |
| 6,095,183 A | * | 8/2000 | Taylor et al. | 137/475 |
| 7,469,714 B2 | * | 12/2008 | Muller | 137/540 |
| 2012/0168005 A1 | * | 7/2012 | Rull et al. | 137/536 |

FOREIGN PATENT DOCUMENTS

| | | |
|---|---|---|
| JP | 58-44573 U | 3/1983 |
| WO | 2011/045318 A1 | 4/2011 |

\* cited by examiner ized setting of a pressure valve.

PRESSURE VALVE

This application claims priority under 35 U.S.C. §119 to patent application no. DE 10 2012 000 368.4, filed on Jan. 11, 2012 in Germany, the disclosure of which is incorporated herein by reference in its entirety.

BACKGROUND

The disclosure relates to a pressure valve, in particular to a directly controlled pressure-limiting valve.

The applicant's data sheet RD 25010-B/10.06 discloses such a pressure valve. Said valve has, as a valve housing, a sleeve which can be screwed into a control block and in which a valve spring is arranged. Said valve spring is supported on a valve plate and applies a spring force to a valve body of the pressure valve in the direction of the valve seat thereof. A connection between a pressure port and a tank port can be controlled by means of the valve body. In this context, a pressure force, counteracting the spring force, of a pressure medium of the pressure port can be applied to the valve body. If the pressure force acting on the valve body exceeds the spring force, the valve body lifts off from its valve seat and opens a pressure medium connection to the spring space of the valve spring, which spring space is connected to the tank port.

The spring plate can be adjusted in the axial direction in order to change the spring force of the valve spring by means of an adjustment mechanism which is arranged in a closure element of the sleeve, wherein the closure element is screwed into the sleeve. The adjustment mechanism has a shaft with a threaded section which can be screwed into an inner thread of the sleeve and with a securing section for the spring plate. The securing section has a radially set back end section about which the spring plate engages. The spring plate has for this purpose a continuous drilled hole via which it is plugged onto the securing section. The spring plate is supported on an annular end face of the securing section by means of its end face which points away from the valve spring, which annular end face is formed by the set back end section. The spring plate is then secured to the shaft in the axial direction by means of a circlip. The end face of the spring plate also serves as a bearing shoulder via which the spring plate can be supported on the closure element. The shaft can be screwed relative to the sleeve from the outside with a tool. If the pressure valve is used as a safety valve, the shaft and the valve housing can be configured in such a way that they can be provided with a lead seal.

A disadvantage with this solution is that during the adjustment or screwing of the shaft of the adjustment mechanism in order to change the spring force of the valve spring, such a high torque can be transmitted to the closure element or the sleeve that the latter is undesirably released from its screwed and secured position. This is the case, in particular, when the spring plate bears with its end face against the closure element, as a result of which a torque can then be transmitted to the closure element via the shaft and via the spring plate which is secured thereto. This effect is amplified if there is a pressure in the spring space. If the closure element and/or the sleeve are/is unintentionally released, this can lead in an extremely disadvantageous fashion to, for example, pressure medium escaping from the pressure valve. If the closure element is screwed out completely, this said spring element could be accelerated strongly in the direction away from the valve housing owing to the relaxing valve spring and/or the pressure force, and in the worst case could cause injuries to persons.

In view of the above, the disclosure is based on the object of providing a pressure valve which has a high level of safety.

SUMMARY

This object is achieved by means of a pressure valve having the features of the disclosure.

Various advantageous embodiments of the disclosure are the subject matter of further dependent claims.

According to the disclosure, a pressure valve, in particular a pressure-limiting valve which is embodied as a seat valve, has a valve housing. A spring plate, on which a valve spring, which applies a spring force to a valve body of the pressure valve, in particular in the direction of the valve seat thereof, is supported, is arranged in said valve housing. In order to change the spring force, the spring plate can be displaced by means of a setting spindle in the direction of increasing or decreasing the spring force. The setting spindle advantageously has two parts, specifically a spindle shaft which is arranged in the valve housing in a displaceable and sliding fashion, and an adjustment screw which can be screwed into the valve housing or into a closure element of the valve housing. In this context, the spindle shaft is connected to the spring plate. The adjustment screw which is preferably arranged coaxially with respect to the spindle shaft and the spindle shaft are configured here in such a way that the adjustment screw can be rotated or moved in its circumferential direction relative to the spindle shaft and can displace the spindle shaft in an axial direction.

This solution has the advantage that a torque cannot be transmitted from the adjustment screw to the spindle shaft, for example during the screwing in or screwing out of the adjustment screw out of the valve housing. In contrast to the prior art, screwing out of parts of the pressure valve which are connected to the setting spindle is therefore effectively prevented, making the pressure valve extremely secure. As a result, the safety is increased, in particular when setting the spring force. Furthermore, such a pressure valve is of extremely simple design in terms of device technology.

In a further refinement of the disclosure, the spindle shaft is guided in a seal-forming fashion in the valve housing, as a result of which said spindle shaft can effectively seal off an interior space of the valve housing from the outside even when the adjustment screw is screwed out of the valve housing.

The spring plate preferably has a shoulder which can bear against the valve housing or against the closure element of the valve housing in order to limit its displacement travel in a direction away from the valve body or in the direction of decreasing the spring force, as a result of which the displacement travel of the spindle shaft which is connected thereto is also limited.

The spindle shaft and the spring plate can easily be embodied in one piece in terms of device technology, or they can be connected in a frictionally engaging fashion, positively engaging fashion and/or materially joined fashion.

In order to additionally guide the spindle shaft with respect to the valve housing or with respect to the closure element of the valve housing, the adjustment screw can at least partially engage around the spindle shaft.

The spindle shaft preferably has a first guide section which is guided in the valve housing or in the closure element of the valve housing, and a second end section which is set back radially with respect to the guide section and around which the adjustment screw then engages. For the engagement around the end section of the spindle shaft, the adjustment screw has an axial recess or drilled hole, in particular blind drilled hole, into which the end section of the spindle shaft can then be introduced.

The adjustment screw and the spindle shaft are advantageously configured in such a way that they engage one behind the other in the axial direction, as a result of which they form a unit and the adjustment screw cannot be lost in a state in which it is screwed out of the valve housing.

For the adjustment screw and the spindle shaft to engage one behind the other, a protruding projection, in particular an inner collar, can be formed in the drilled hole of the adjustment screw and a protruding projection, in particular an outer collar, can be formed on the end section of the spindle shaft.

So that the end section of the spindle shaft can be easily introduced into the recess in the adjustment screw, a guide pin is formed on the end section of the spindle shaft.

The adjustment screw can easily move the spindle shaft axially over its end face.

The spindle shaft is preferably guided in a closure element of the valve housing, and the adjustment screw can be screwed into the closure element from the outside, wherein the closure element is, in particular, screwed into the valve housing. If the pressure valve is embodied as a screw-in valve, the valve housing can then, for example, be screwed into a valve drilled hole in a control block.

BRIEF DESCRIPTION OF THE DRAWINGS

Preferred embodiments of the disclosure are explained in more detail below with reference to schematic drawings, in which.

DETAILED DESCRIPTION

Figure 1:
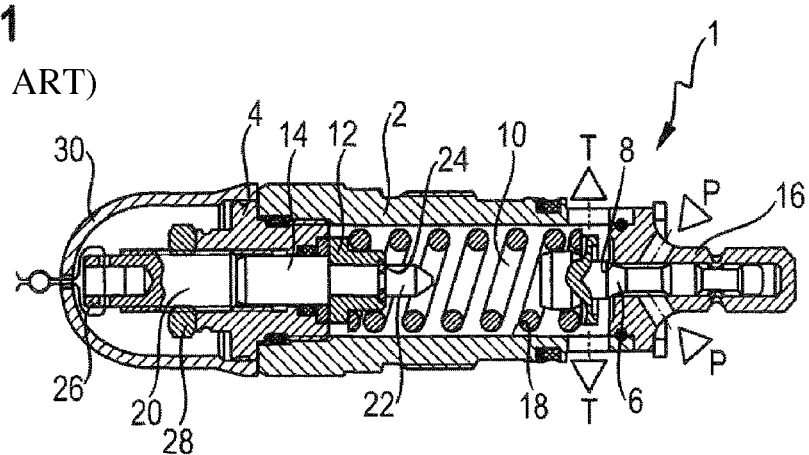
FIG. 1 shows a pressure valve from the prior art in a longitudinal sectional view.

FIG. 1 shows a pressure valve 1 from the prior art in order to explain the significant components of such a pressure valve 1. The pressure valve 1 is a directly controlled pressure-limiting valve which is disclosed, for example, in the applicant's data sheet RD 25010-B/10.06 mentioned at the beginning. The pressure valve 1 has a valve housing 2 or sleeve which can be screwed into a control block and is closed off by a closure element 4. A valve body 6, to which a valve seat 8, against which it bears in FIG. 1, is assigned, is arranged inside the valve housing 2. A valve spring 10 which is arranged in the valve housing 2 applies a spring force to the valve body 6 in the direction of the valve seat 8 thereof. The valve spring 10 which is embodied is a pressure spring is supported on a spring plate 12, which is arranged in the valve housing 2 and can be displaced by means of a setting spindle 14 in the longitudinal direction of the pressure valve 1, as a result of which the spring force of the valve spring 10 can be set. The valve spring 8 is formed on a further closure element 16 of the valve housing 2 and controls a pressure medium connection between a pressure port P which is provided on the closure element 16 and a tank port T which is provided on the valve housing 2. Said tank port T is connected to a spring space 18 of the valve housing 2, in which spring space 18 the spring 10 is arranged. A pressure force can be applied to the valve body 6 via the pressure port P counter to the spring force of the valve spring 10 in the direction of the opening position of said valve body 6. If this pressure force exceeds the forces acting on the valve body 6 in the closing direction, in particular the spring force, the valve body 6 lifts off from its valve seat 8 and opens the pressure medium connection between the pressure port P and the tank port T.

The setting spindle 14 has a shaft 20 which is screwed into the closure element 4 via an outer thread. The closure element 4 has for this purpose a continuous drilled hole with an inner thread. The shaft 20 has a thread section with an outer thread and an adjoining seal-forming section on which a sealing element, arranged in the closure element 4, is supported in order to seal off the spring space 18 from the outside. The closure element projects with an end section 22 into the spring space 18. Said spring space 18 is set back radially with respect to the seal-forming section, as a result of which an annular end face is formed on which the spring plate 12 is supported on the shaft 20. The spring plate 12 has a continuous drilled hole and is plugged via the latter onto the end section 22 of the shaft 20 and is secured thereto with a circlip 24. The spring plate 12 is therefore secured on the shaft 20 between the annular end face and the circlip 24. The shaft 20 also has a tool section 26 which protrudes from the closure element 20, with a hexagon socket recess which is formed axially therein from the outside at the end. The shaft 20 is additionally fixed to the closure element 4 by means of a check nut 28.

The pressure valve 1 can be inserted as a safety valve and for this reason has a cover element 30 which is in the form of a dome and which blocks off the access to the tool section 26 of the shaft 20 and is secured to the closure element 4. In order to set the spring force of the valve spring 10, the position of the valve plate 12 is changed by means of the shaft 20, with the cover element 30 being removed in this context. Screwing out the shaft 20 can lead to the application of torque to the closure element 4 and/or the valve housing 2 which is explained at the beginning.

Figure 2:
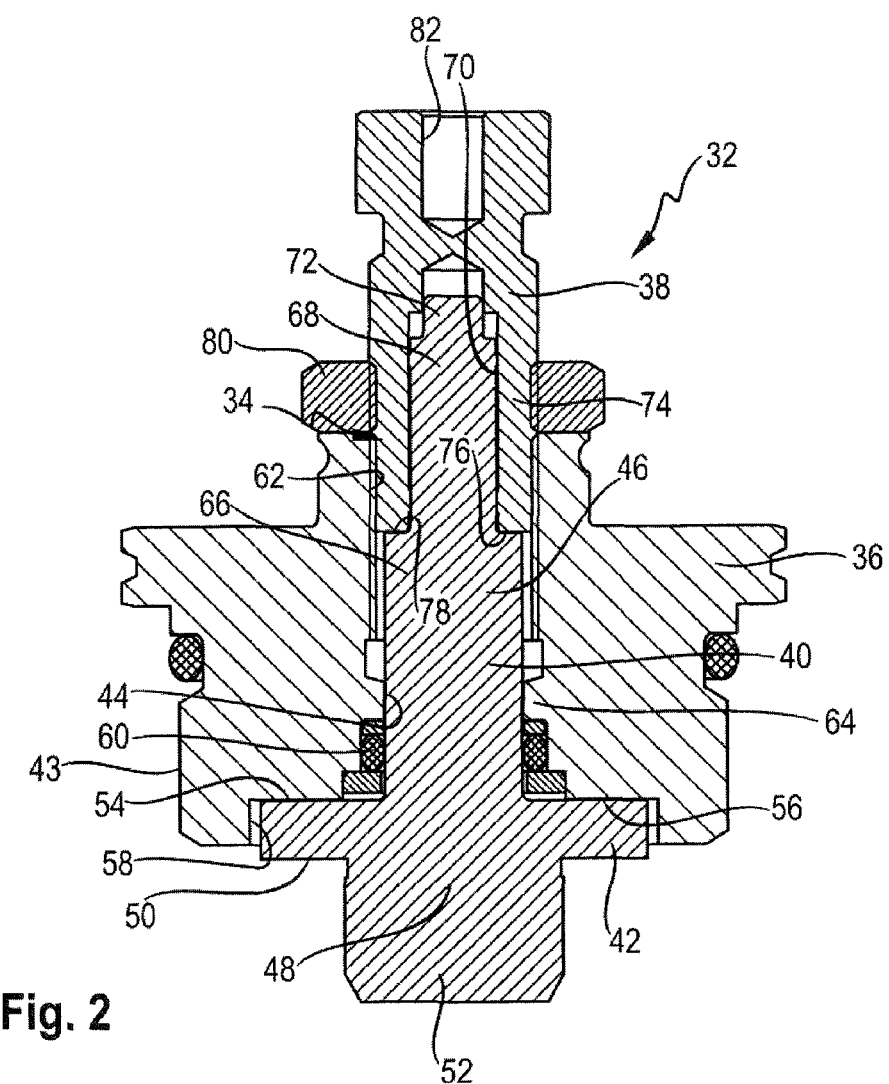
FIGS. 2 to 5 show an inventive setting spindle of a pressure valve according to a first exemplary embodiment in a longitudinal sectional view.

FIG. 2 shows the components of a pressure valve 32 according to the disclosure which are significant for the disclosure. Said pressure valve 32 has a setting spindle 34 which is divided in two and has an adjustment screw 38 which is screwed into a closure element 36 and a spindle shaft 40 which is guided in a seal-forming fashion in the closure element 36. A spring plate 42 is formed on said spindle shaft 40. The closure element 36 can be screwed into a sleeve—see, for example, the valve housing 2 in FIG. 1—by means of a thread 43 and can be closed with a cover element.

The spindle shaft 40 has a guide section 46 which is guided in a sliding and seal-forming fashion in a continuous drilled hole 44 in the closure element 36. The spindle shaft 40 protrudes with an end section 48 out of the closure element 36 in the direction of the spring space (not illustrated) of the pressure valve 32. The spring plate 42 which is formed in one piece on the end section 48 is formed by an outer collar on the spindle shaft 40. A valve spring (not illustrated in FIG. 2) of the pressure valve 32 is supported on an annular end face 50, pointing away from the closure element 36, of the spring plate 42. Adjacent to the spring plate 42, the end section 48 of the spindle shaft 40 is widened radially in comparison with the guide section 46, to form a guide pin 52 for the valve spring. The spring plate 42 in FIG. 2 bears with its annular end face 54 or shoulder 54, pointing to the closure element 36, against a bearing face 56 of the closure element 36. The bearing face 56 is formed in the closure element 36 as an annular base surface of a recess 58, having an approximately circular-cylindrical cross section, of the closure element 36. Said recess 58 has a larger diameter and a smaller depth than the spring plate 42, for which reason in the state shown in FIG. 2 the latter is only partially immersed in the recess 58. Adjacent to the recess 58, the continuous drilled hole 44 of the closure element 36 has two steps which serve to hold seal-forming means 60. An inner thread 62 is formed in the continuous drilled hole 44 in the closure element 36 from an outer side pointing away from the bearing face 56, and extends, when viewed in the longitudinal direction, approximately halfway along the continuous drilled hole 44. A guide section 64, in which the spindle shaft 40 is guided with its centrally formed guide section 66, is provided in the continuous drilled hole 44, between the inner thread 62 and the steps for the seal-forming means 60, wherein the outer lateral surface of said guide section 66 can then slide on an inner lateral surface of the guide section 64. The guide section 64 of the continuous drilled hole 44 has the smallest diameter in the continuous drilled hole 44. The further end section 68, pointing away from the end section 48, of the spindle shaft 40 is radially set back and is dipped into a blind drilled hole 70 of the adjustment screw 38. On the end, the end section 68 of the spindle shaft 40 has a guide pin 72 which, when the spindle shaft 40 is mounted, with the adjustment screw 38, serves for easy introduction of the end section 68 of the spindle shaft 40 into the blind drilled hole 70.

The adjustment screw 38 has an outer threaded section 74 which, in FIG. 2, is partially screwed into the inner thread 62 of the closure element 36. As a result of the blind drilled hole 70, an annular end face 76 which points to the spindle shaft 40 is formed on the adjustment screw 38, which annular end face 76 can be made to bear against an annular face 78, formed by the set back end section 68 of the spindle shaft 40, in order to axially displace the spindle shaft 40. The blind drilled hole 70 has at its base-side end section a reduced diameter which is somewhat larger than the diameter of the guide pin 72 so that the latter can be immersed therein. In FIG. 2, the end section 68 of the spindle shaft 40 is completely immersed in the adjustment screw 38 and at the same time is spaced apart at the end from a base surface of the blind drilled hole 70, as a result of which the spindle shaft 40 bears axially only over the annular face 78 against the adjustment screw 38. Furthermore, a check nut 80 is screwed onto the outer threaded section 74 of the adjustment screw 38. A tool, in particular a socket head wrench, can act on the adjustment screw 38 via the hexagon socket recess 82 which is formed in the adjustment screw 38 from an end side of said adjustment screw 38 pointing away from the closure element 36, in order to be able to screw said adjustment screw 38 in or unscrew it.

Figure 3:
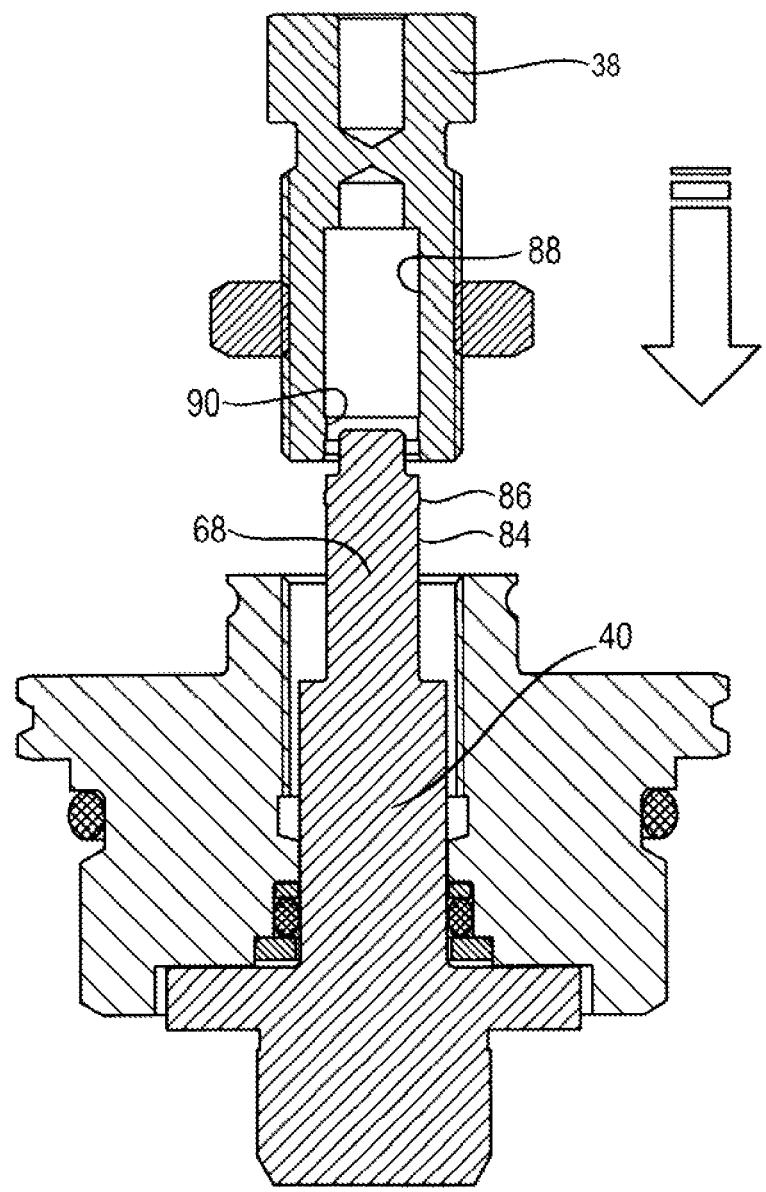

FIG. 3 shows the adjustment screw 38 and the spindle shaft 40 in a separated state. In this context it is apparent that an outer collar 86 is formed on an outer lateral surface 84 of the end section 68. In the assembled state of the spindle shaft 40 and adjustment screw 38, said outer collar 86 engages behind an inner collar 90 which is formed on an inner lateral surface 88 of the blind drilled hole 70 of the adjustment screw 38. In order to mount the adjustment screw 38 and the spindle shaft 40, the adjustment screw 38 is pressed with its inner collar 90 over the outer collar 86 of the spindle shaft 40. The spindle shaft 40 and the adjustment screw 38 are connected in a positively locking fashion in the axial direction by the collars 86 and 90 which engage one behind the other. In the radial direction, the spindle shaft 40 and the adjustment screw 38 have a small amount of play, as a result of which they can be moved easily in the axial direction and circumferential direction with respect to one another.

Figure 4:
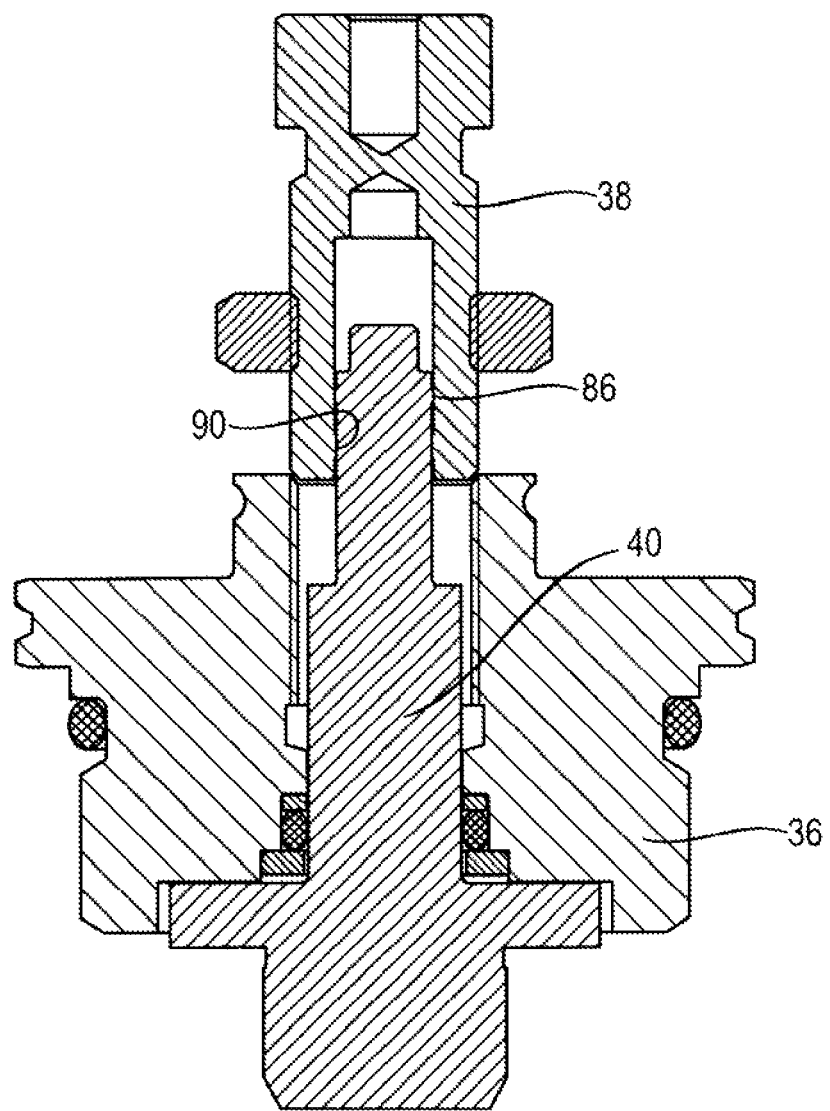

In FIG. 4, the adjustment screw 38 and the spindle shaft 40 are illustrated in the mounted state, wherein the adjustment screw 38 is not screwed into the closure element 36. It is apparent here that the inner collar 90 and the outer collar 88 engage one behind the other and are spaced apart from one another in the axial direction. The collars 88 and 90 are therefore embodied in such a way that the adjustment screw 38 can be screwed completely out of the closure element 36 without the collars 88, 90 bearing one against the other. In the completely unscrewed state of the adjustment screw 38, it is then advantageously connected in a positively locking fashion to the spindle shaft 40 in the axial direction by means of the collars 88, 90, as a result of which the adjustment screw 38 cannot be lost.

Figure 5:
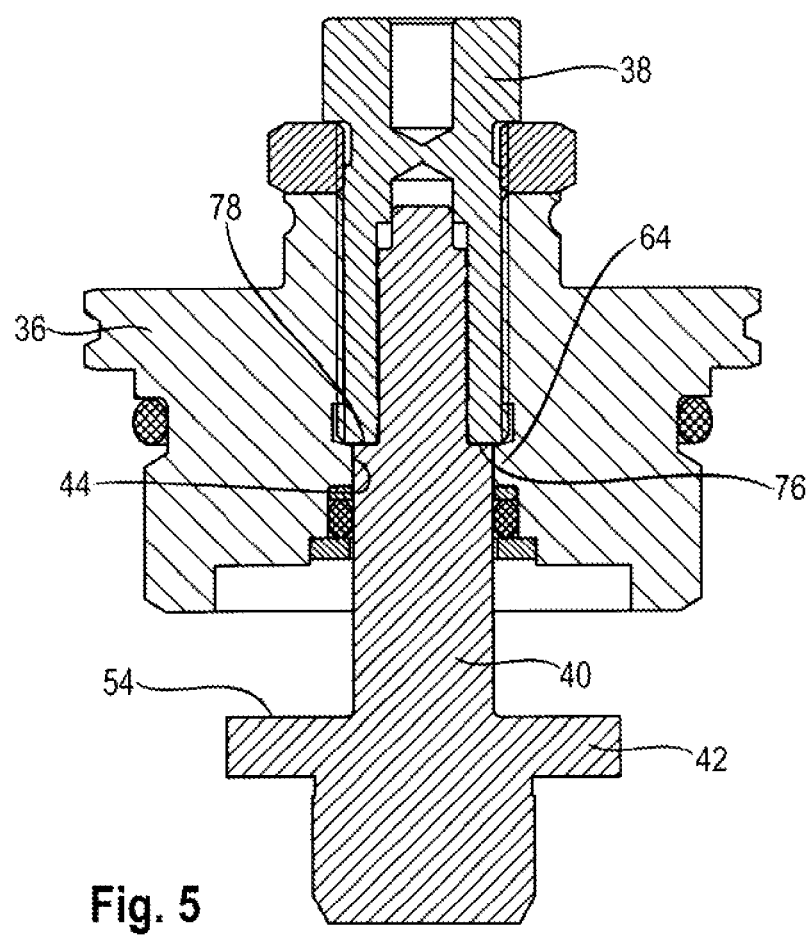

FIG. 5 illustrates the adjustment screw 38 in a state in which it is completely screwed into the closure element 36. The screw-in depth of the adjustment screw 38 is limited by the guide section 64 of the continuous drilled hole 44, in which guide section 64 the adjustment screw 38 bears against the latter. The spindle shaft 40 is displaced axially by the adjustment screw 38 via the annular end face 76 and the annular face 78, wherein the spring plate 42 is moved with its annular end face 54 away from the closure element 36. If the adjustment screw 38 is screwed again out of the closure element 36 from the position shown in FIG. 5, the spindle shaft 40 is also moved in this direction by the spring force of the valve spring (not illustrated).

Starting from the position shown in FIG. 2, the annular end face 76 lifts off from the annular face 78 when the adjustment screw 38 is unscrewed further, since the spindle shaft 40 bears with its spring plate 42 against the closure element 36. In the case of the pressure valve 32 according to the disclosure, in this position of the spindle shaft 40 the adjustment screw 38 cannot, in contrast to the prior art, transmit any torque via said spindle shaft 40 to the closure element 36, as a result of which there is no risk of the closure element 36 being unscrewed from a valve housing (not illustrated) via the spindle shaft 40 and the spring plate 42 when the adjustment screw 38 is unscrewed.

Figure 6:
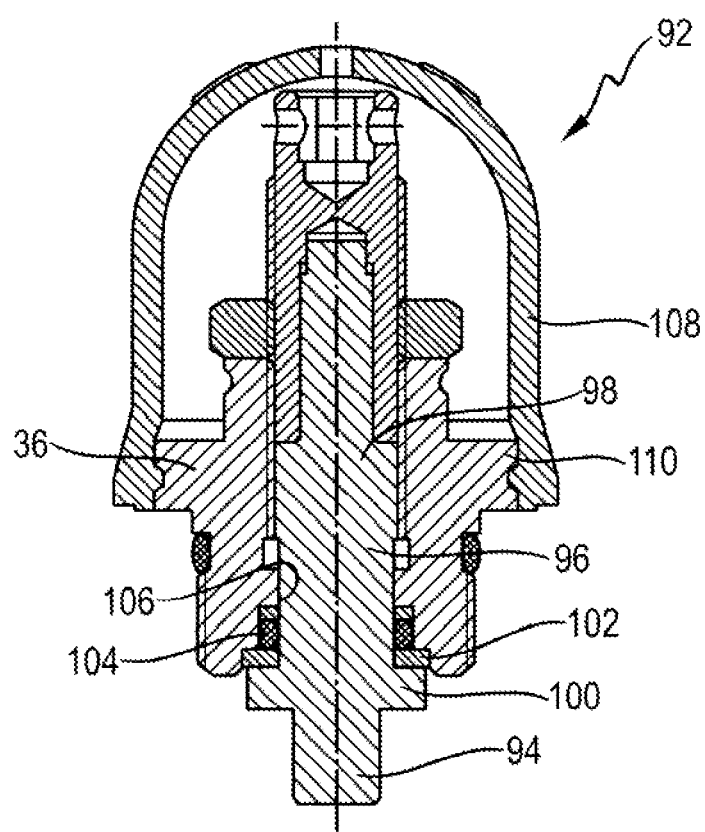
FIG. 6 shows the inventive setting spindle of a pressure valve according to a second exemplary embodiment in a longitudinal sectional view.

FIG. 6 shows a second embodiment of a pressure valve 92 according to the disclosure, wherein for the sake of simplicity only the essential differences are indicated. A guide pin 94 has a smaller diameter here than a guide section 96 of a spindle shaft 98. A spring plate 100 is supported in the position of the spindle shaft 98 shown in FIG. 6 against an annular securing means 102 for an O sealing ring 104 of sealing means for a continuous drilled hole 106 in the closure element 36.

In FIG. 6, a covering element 108 which is in the form of a dome is provided on the closure element 36 in an essentially positively locking fashion on an outer collar 110 of the closure element 36.

A pressure valve having a spring plate which can be displaced by means of a setting spindle is disclosed. The setting spindle has for this purpose an adjustment screw which can axially displace a spindle shaft on which the spring plate is provided. The adjustment screw and the spindle shaft are configured here in such a way that virtually no torque can be transmitted to the spindle shaft via the adjustment screw.

LIST OF REFERENCE NUMBERS

1 Pressure valve
2 Valve housing
4 Closure element
6 Valve body
8 Valve seat
10 Valve spring
12 Spring plate
14 Setting spindle
16 Closure element
18 Spring space 20 Shaft
22 End section
24 Circlip
26 Tool section
28 Check nut
30 Cover element
32 Pressure valve
34 Setting spindle
36 Closure element
38 Adjustment screw
40 Spindle shaft
42 Spring plate
43 Thread
44 Continuous drilled hole
46 Guide section
48 End section
50 Annular end face
52 Guide pin
54 Shoulder
56 Bearing face
58 Recess
60 Sealing means
62 Inner thread
64 Guide section
66 Guide section
68 End section
70 Blind drilled hole
72 Guide pin
74 Outer thread section
76 Annular end face
78 Annular face
80 Check nut
82 Recess
84 Outer lateral face
86 Outer collar
88 Inner lateral face
90 Inner collar
92 Pressure valve
94 Guide pin
96 Guide section
98 Spindle shaft
100 Spring plate
102 Annular securing means
104 O sealing ring
106 Continuous drilled hole
108 Cover element
110 Outer collar

What is claimed is:

1. A pressure valve, comprising:
a valve housing;
a spring plate arranged in the valve housing;
a valve spring supported on the spring plate, the valve spring applying a spring force to a valve body; and
a setting spindle configured to displace the spring plate so as to set the spring force,
wherein the setting spindle includes a spindle shaft which is one-piece with the spring plate and is displaceably arranged in the valve housing and an adjustment screw which is configured to be screwed into the valve housing against said spindle shaft, and
wherein the adjustment screw and the spindle shaft are configured to be moved relative to one another in a circumferential direction and the spindle shaft is configured for displacement together with the spring plate in an axial direction by the adjustment screw,
wherein the spring plate defines a shoulder configured to bear against the valve housing and to limit displacement of the spindle shaft in the axial direction away from the valve spring,
wherein the spindle shaft extends in the axial direction between the shoulder and the adjustment screw, and
wherein the spindle shaft is configured to be displaced axially over an end face of the adjustment screw.

2. The pressure valve as claimed in claim 1, wherein the spindle shaft is guided in a seal-forming fashion in the valve housing.

3. The pressure valve as claimed claim 1, wherein the adjustment screw at least partially engages an end section of the spindle shaft.

4. The pressure valve as claimed in claim 1, wherein the setting spindle is arranged on a closure element of the valve housing.

5. A pressure valve, comprising:
a valve housing;
a spring plate arranged in the valve housing;
a valve spring supported on the spring plate and configured to apply a spring force to a valve body; and
a setting spindle configured to displace the spring plate so as to set the spring force, the setting spindle including (i) a spindle shaft connected to the spring plate and displaceably arranged in the valve housing, and (ii) an adjustment screw configured to be screwed into the valve housing,
wherein the adjustment screw is configured for movement in a circumferential direction relative to the spindle shaft,
wherein the spindle shaft and the spring plate are configured for displacement in an axial direction by the adjustment screw,
wherein the spindle shaft includes a guide section which is guided in the valve housing and an end section which is set back radially with respect to the guide section, and
wherein the adjustment screw is configured to engage the end section.

6. The pressure valve as claimed in claim 5, wherein:
the adjustment screw defines an axial drilled hole, and
the end section of the spindle shaft is configured to be introduced into the axial drilled hole.

7. The pressure valve as claimed in claim 6, wherein the adjustment screw and the spindle shaft are configured to engage each other one behind the other in the axial direction.

8. The pressure valve as claimed in claim 7, wherein:
a protruding projection extends from the end section of the spindle shaft; and
in order to permit the adjustment screw and the spindle shaft to engage each other one behind the other, the axial drilled hole of the adjustment screw defines a recess configured to at least partially receive the protruding projection.

9. The pressure valve as claimed in claim 6, wherein the axial drilled hole is a blind drilled hole.

10. The pressure valve as claimed in claim 5, wherein a guide pin is formed on the end section of the spindle shaft.

11. A pressure valve, comprising:
a valve housing;
a spring plate arranged in the valve housing;
a valve spring supported on the spring plate, the valve spring applying a spring force to a valve body; and
a setting spindle configured to displace the spring plate so as to set the spring force, the setting spindle including (i) a spindle shaft connected to the spring plate and displaceably arranged in the valve housing, and (ii) an adjustment screw configured to be screwed into the valve housing, wherein the adjustment screw and the spindle shaft are configured to be moved relative to one another in a circumferential direction and the spindle shaft is configured for displacement together with the spring plate in an axial direction by the adjustment screw, wherein a seal is engaged between the spindle shaft and the valve housing, and wherein the spring plate defines a shoulder configured to bear against the valve housing and to limit displacement of the spindle shaft in the axial direction away from the valve spring.

12. The pressure valve as claimed in claim 11, wherein the spring plate and the spindle shaft are embodied in one piece.

13. The pressure valve as claimed claim 11, wherein the adjustment screw at least partially engages an end section of the spindle shaft.

14. The pressure valve as claimed in claim 11, wherein the spindle shaft is configured to be displaced axially over an end face of the adjustment screw.

15. The pressure valve as claimed in claim 11, wherein the setting spindle is arranged on a closure element of the valve housing.

16. The pressure valve as claimed in claim 11, wherein:
the spindle shaft includes a guide section which is guided in the valve housing and an end section which is set back radially with respect to the guide section, and
the adjustment screw is configured to engage the end section.

* * * * *